United States Patent
Yasuda

(10) Patent No.: US 10,048,638 B2
(45) Date of Patent: Aug. 14, 2018

(54) DRIVE TRANSMISSION DEVICE AND IMAGE FORMING APPARATUS INCORPORATING THE DRIVE TRANSMISSION DEVICE

(71) Applicant: Jun Yasuda, Kanagawa (JP)

(72) Inventor: Jun Yasuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/452,542

(22) Filed: Mar. 7, 2017

(65) Prior Publication Data

US 2017/0261909 A1 Sep. 14, 2017

(30) Foreign Application Priority Data

Mar. 14, 2016 (JP) .................... 2016-049697

(51) Int. Cl.
*G03G 15/00* (2006.01)
*F16H 1/20* (2006.01)
*G03G 21/16* (2006.01)
*G03G 21/18* (2006.01)

(52) U.S. Cl.
CPC ............ *G03G 15/757* (2013.01); *F16H 1/20* (2013.01); *G03G 21/1647* (2013.01); *G03G 21/1857* (2013.01); *G03G 2215/0132* (2013.01)

(58) Field of Classification Search
CPC ............ G03G 15/757; G03G 21/1647; G03G 21/1857; G03G 2215/0132; F16H 1/20
USPC ........................................... 399/167
See application file for complete search history.

(56) References Cited

U.S. PATENT DOCUMENTS

| 7,380,787 B2* | 6/2008 | Fukumura .......... H04N 1/00519 271/264 |
|---|---|---|
| 2010/0226676 A1 | 9/2010 | Funamoto et al. |
| 2010/0239318 A1 | 9/2010 | Maehata et al. |
| 2011/0058870 A1 | 3/2011 | Murakami et al. |
| 2013/0101314 A1 | 4/2013 | Yasuda et al. |
| 2013/0237366 A1 | 9/2013 | Yasuda et al. |
| 2014/0119777 A1 | 5/2014 | Fujimoto et al. |
| 2015/0060191 A1 | 3/2015 | Matsuda et al. |
| 2016/0238982 A1 | 8/2016 | Matsuda et al. |

FOREIGN PATENT DOCUMENTS

| JP | 2001-108072 | 4/2001 |
|---|---|---|
| JP | 2010-059998 | 3/2010 |
| JP | 2014-089371 | 5/2014 |

* cited by examiner

*Primary Examiner* — Hoang Ngo
(74) *Attorney, Agent, or Firm* — Duft Bornsen & Fettig LLP

(57) ABSTRACT

A drive transmission device, which is included in an image forming apparatus and detachably attached to an apparatus body configured to include a driven body to which a driving force is transmitted, includes a first opposing body and a second opposing body disposed facing each other and forming a gap therebetween, a gear rotatably disposed in the gap formed between the first opposing body and the second opposing body, and a rotary shaft configured to receive the driving force from a drive source and rotate in the gap. One rotational axial end of the rotary shaft being passed through the second opposing body and rotatably supported by the second opposing body in the gap.

13 Claims, 6 Drawing Sheets

106c 106a
106b 106

106

110
114
106

DRIVE TRANSMISSION DEVICE AND IMAGE FORMING APPARATUS INCORPORATING THE DRIVE TRANSMISSION DEVICE

CROSS-REFERENCE TO RELATED APPLICATION

This patent application is based on and claims priority pursuant to 35 U.S.C. § 119(a) to Japanese Patent Application No. 2016-049697, filed on Mar. 14, 2016, in the Japan Patent Office, the entire disclosure of which is hereby incorporated by reference herein.

BACKGROUND

Technical Field

This disclosure relates to a drive transmission device and an image forming apparatus incorporating the drive transmission device. The drive transmission device is detachably attached to the apparatus body that includes a driven body that functions as a transmission target to which a driving force is transmitted.

Related Art

Some known drive transmission units include two members disposed facing each other with a gap across the two members and a gear or gears to rotate in the gap formed between the two members. Such a known drive transmission unit is detachably attached to an apparatus body provided with a driven body that functions as a transmission target to which a driving force applied by the known drive transmission unit.

For example, a known drive transmission unit that is detachably attached to an apparatus body of a printer includes two unit plates disposed facing each other with a gap formed across these units plates and multiple gears to rotate meshing with each other in the gap. While the drive transmission unit is attached to the apparatus body of the printer, a photoconductor that functions as a driven body is detachably attached to the apparatus body. The photoconductor has a rotary shaft to which a photoconductor gear is fixed. When the photoconductor is set to the apparatus body of the printer, a gear tip of the photoconductor gear is firstly set to a position facing the gap formed between the unit plates of the drive transmission unit that is attached to the apparatus body of the printer. Then, the position of the gear tip is gradually moved toward the gap. Consequently, the photoconductor is set to the apparatus body of the printer. The photoconductor that has been set to the apparatus body of the printer then causes the gear tip of the photoconductor gear to enter into the gap formed between the unit plates of the drive transmission unit, so that the photoconductor is meshed with a gear disposed in the gap. Due to this meshing of the photoconductor gear and the gear in the gap, the driving force is transmitted from the drive transmission unit to the photoconductor. Since the above-described drive transmission unit is detachably attachable to the apparatus body of the printer, the maintainability of the printer can be enhanced.

SUMMARY

At least one aspect of this disclosure provides a drive transmission device, which is detachably attached to an apparatus body configured to include a driven body to which a driving force is transmitted, including a first opposing body and a second opposing body disposed facing each other and forming a gap therebetween, a gear rotatably disposed in the gap formed between the first opposing body and the second opposing body, and a rotary shaft configured to receive the driving force from a drive source and rotate in the gap. One rotational axial end of the rotary shaft is passed through the second opposing body and rotatably supported by the second opposing body in the gap.

Further, at least one aspect of this disclosure provides an image forming apparatus including an apparatus body, an image forming device configured to form an image on a recording medium, and the above-described drive transmission device detachably attached to the apparatus body and configured to support the image forming device.

DETAILED DESCRIPTION

Figure 1:
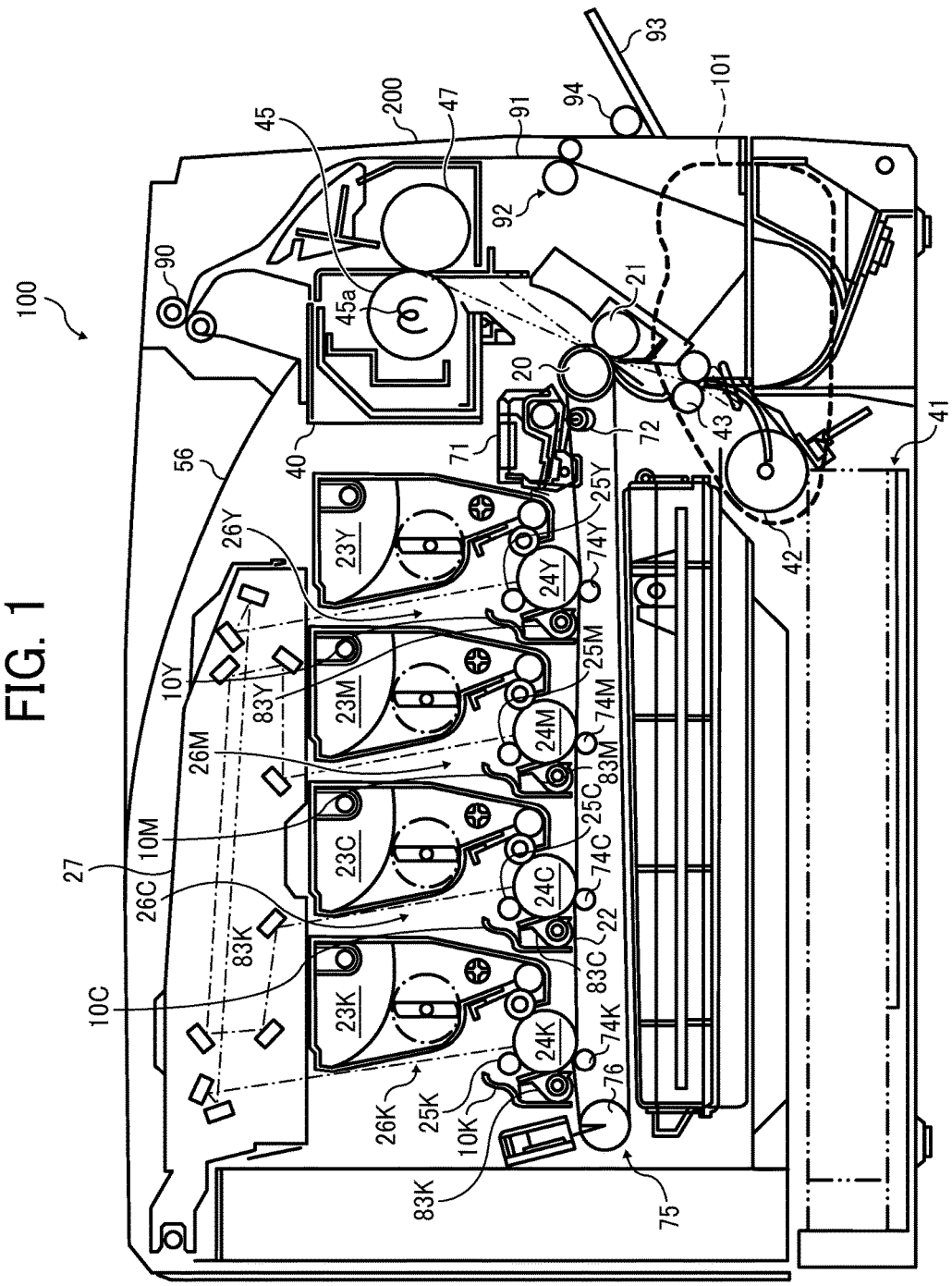
FIG. 1 is a diagram illustrating a schematic configuration of an image forming apparatus according to an embodiment of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Now, a description is given of an electrophotographic image forming apparatus 100 for forming images by electrophotography, according to an embodiment of this disclosure. It is to be noted that, hereinafter, the electrophotographic image forming apparatus 100 is referred to as the image forming apparatus 100.

It is to be noted that identical parts are given identical reference numerals and redundant descriptions are summarized or omitted accordingly.

The image forming apparatus 100 may be a copier, a facsimile machine, a printer, a multifunction peripheral or a multifunction printer (MFP) having at least one of copying, printing, scanning, facsimile, and plotter functions, or the like. According to the present embodiment, the image forming apparatus 100 is an electrophotographic printer that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

Hereinafter, a color laser printer according to an embodiment of this disclosure is described as an image forming apparatus in an electrophotography system, to which the present invention is applied.

At first, a description is given of a basic configuration of the image forming apparatus 100 according to the present embodiment of this disclosure.

FIG. 1 is a diagram illustrating a schematic configuration of the image forming apparatus 100 according to the present embodiment of this disclosure.

The image forming apparatus 100 includes four image forming units 26K, 26C, 26M, and 26Y for forming respective toner images of yellow (Y), magenta (M), cyan (C), and black (K) color toners. The configurations of the image forming units 26K, 26C, 26M, and 26Y are basically identical to each other, except that the image forming units 26K, 26C, 26M, and 26Y include toners of different colors as image forming substances. Each of the image forming units 26K, 26C, 26M, and 26Y is replaced at the end of its service life.

Figure 2:
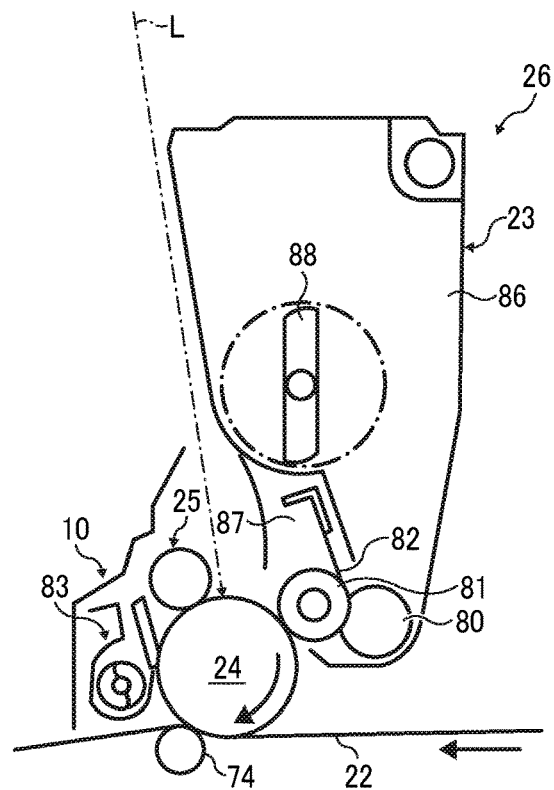
FIG. 2 is an enlarged view illustrating one of four image forming units included in the image forming apparatus of FIG. 1.

FIG. 2 is an enlarged view illustrating one of four image forming units 26K, 26C, 26M, and 26Y included in the image forming apparatus 100 of FIG. 1. Since the process units 26K, 26C, 26M, and 26Y have respective configurations identical to each other except the toner colors, the image forming units 26K, 26C, 26M, and 26Y and image forming components included in the image forming units 26K, 26C, 26M, and 26Y are also described without suffixes indicating the toner colors, which are K, C, M, and Y.

As illustrated in FIG. 2, the image forming process unit 26 (i.e., the image forming units 26K, 26C, 26M, and 26Y) includes a photoconductor unit 10 (i.e., photoconductor units 10K, 10C, 10M, and 10Y) and a developing unit 23 (i.e., developing units 23K, 23C, 23M, and 23Y). The photoconductor unit 10 supports a drum-shaped photoconductor 24 (i.e., drum-shaped photoconductors 24K, 24C, 24M, and 24Y) that functions as an image bearer, a photoconductor cleaning device 83 (i.e., photoconductor cleaning devices 83K, 83C, 83M, and 83Y), a static eliminating device, and a charging device 25 (i.e., charging devices 25K, 25C, 25M, and 25Y). The image forming unit 26 is detachably attachable to an apparatus body 200 of the image forming apparatus 100, and consumable parts of the image forming unit 26 can be replaced at one time.

The charging device 25 uniformly charges a surface of the photoconductor 24 that is rotated by a drive unit in a clockwise direction in FIG. 2.

An optical writing unit 27 emits a laser light beam L so as to irradiate the uniformly charged surface of the photoconductor 24 to form an electrostatic latent image of each single color toner.

The developing unit 23 incorporating toner develops the electrostatic latent image into a toner image. Then, the toner image is primarily transferred onto a surface of an intermediate transfer belt 22.

The photoconductor cleaning device 83 removes residual toner remaining on the surface of the photoconductor 24 after a primary transfer operation. Further, the static eliminating device removes residual electric potential remaining on the surface of the photoconductor 24 after the photoconductor cleaning device 83 has cleaned the surface of the photoconductor 24. This removal of static electricity initializes the surface of the photoconductor 24, so as to prepare for a subsequent image formation.

The developing unit 23 includes a hopper 86 and a developing section 87.

The hopper 86 is a vertically long member to contain toner that functions as developer. The hopper 86 that functions as a developer container includes an agitator 88 and a toner supply roller 80. The agitator 88 is rotated by the drive unit. The toner supply roller 80 that functions as a developer supplier is disposed at a portion vertically lower from the agitator 88 and is rotated by the drive unit. Toner contained in the hopper 86 moves toward the toner supply roller 80 by the force of gravity while being agitated due to rotation of the agitator 88. The toner supply roller 80 includes a metallic cored bar and a roller including foam resin covering a surface of the metallic cored bar. The toner supply roller 80 rotates while collecting the toner accumulated at a lower part of the hopper 86 to the surface of the toner supply roller 80.

The developing section 87 of the developing unit 23 includes a developing roller 81 and a thin layer forming blade 82. The developing roller 81 rotates while contacting the photoconductor 24 and the toner supply roller 80. The thin layer forming blade 82 has a leading edge to contact a surface of the developing roller 81. The toner adhering to the toner supply roller 80 in the hopper 86 is supplied to the surface of the developing roller 81 at a contact portion at which the developing roller 81 and the toner supply roller 80 contact each other. The toner supplied onto the surface of the developing roller 81 passes the contact position at which the developing roller 81 and the thin layer forming blade 82 contact each other along with rotation of the developing roller 81. At this time, the thickness of layer of toner on the surface of the developing roller 81 is regulated. After the thickness of layer has been regulated, the toner adheres to the electrostatic latent image formed on the surface of the photoconductor 24 in a development region that corresponds to a contact portion of the developing roller 81 and the photoconductor 24. This adhesion of toner develops the electrostatic latent image into a visible toner image.

Such image formation is performed in each image forming unit 26 (i.e., the image forming nits 26K, 26C, 26M, and 26Y), so that a single color toner image of each image forming unit 26 is formed on the surface of the photoconductor 24 (i.e., the photoconductors 24K, 24C, 24M, and 24Y).

As illustrated in FIG. 2, the optical writing unit 27 is disposed vertically above the image forming units 26K, 26C, 26M, and 26Y. The optical writing unit 27 functions as a latent image writing device. The optical writing unit 27 emits laser light L from a laser diode based on image data to optically scan the photoconductors 24K, 24C, 24M, and 24Y in the image forming units 26K, 26C, 26M, and 26Y, respectively. Due to this optical scanning, an electrostatic latent image is formed on the surface of each photoconductor 24. In this configuration, the optical writing unit 27 and the four image forming units 26K, 26C, 26M, and 26Y form an image forming device that forms respective black, cyan, magenta, and yellow toner images, which are visible images of different colors from each other, on the photoconductors 24K, 24C, 24M, and 24Y.

While causing a polygon motor to rotate a polygon mirror so as to deflect the laser light L emitted by the light source in a main scanning direction, the optical writing unit 27 irradiates the deflected laser light L to the photoconductor 24 via multiple optical lenses and mirrors. The optical writing unit 27 may be a device that performs optical writing by LED light emitted by multiple light emitting diodes (LEDs) of an LED array.

A transfer unit 75 is disposed vertically below the photoconductors 24K, 24C, 24M, and 24Y. The transfer unit 75 functions as a belt unit that rotates endlessly in a counterclockwise direction in FIG. 1 while stretching the endless intermediate transfer belt 22 with tension. The transfer unit 75 includes the intermediate transfer belt 22, a drive roller 76, a tension roller 20, four primary transfer rollers 74K, 74C, 74M, and 74Y, a secondary transfer roller 21, a belt cleaning device 71, and a cleaning backup roller 72.

The intermediate transfer belt 22 functions as a belt member as well as a transfer roller. The intermediate transfer belt 22 is stretched by the drive roller 76, the tension roller 20, the cleaning backup roller 72, and the four primary transfer rollers 74K, 74C, 74M, and 74Y, which are disposed inside the loop of the intermediate transfer belt 22. Then, due to a rotation force of the drive roller 76 that is rotated by a drive unit in the counterclockwise direction in FIG. 1, the intermediate transfer belt 22 is endlessly rotated in the same direction as the drive roller 76.

The four primary transfer rollers 74K, 74C, 74M, and 74Y hold the intermediate transfer belt 22 that rotates endlessly with the photoconductors 24K, 24C, 24M, and 24Y, respectively. By so doing, four primary transfer nip regions are formed on respective four positions where a front face of the intermediate transfer belt 22 and respective photoconductors 24K, 24C, 24M, and 24Y contact.

Primary transfer biases are applied by a transfer power supply to the primary transfer rollers 74Y, 74C, 74M, and 74K, respectively. Accordingly, a transfer electric field is formed in each transfer nip region formed between the electrostatic latent image of the photoconductor 24 (i.e., the photoconductors 24K, 24C, 24M, and 24Y) and the primary transfer roller 74 (i.e., the primary transfer rollers 74K, 74C, 74M, and 74Y). It is to be noted that the primary transfer roller 74 may be replaced with a transfer charger or a transfer brush.

The yellow toner image formed on the surface of the photoconductor 24Y of the image forming unit 26Y enters the primary transfer nip region as the photoconductor 24Y rotates. In the primary transfer nip region for yellow toner image, due to the transfer electric field and a nip pressure, the yellow toner image is primarily transferred from the photoconductor 24Y onto the intermediate transfer belt 22. After the yellow toner image is primarily transferred onto the intermediate transfer belt 22, the intermediate transfer belt 22 continues to rotate endlessly. As the intermediate transfer belt 22 rotates and passes the primary transfer nip regions for magenta, cyan, and black toner images, the magenta, cyan, and black toner images formed on the photoconductors 24M, 24C, and 24K are also primarily transferred and sequentially overlaid onto the intermediate transfer belt 22. By primarily transferring the single color toner images, a four-color toner image is formed on the intermediate transfer belt 22.

The secondary transfer roller 21 included in the transfer unit 75 is disposed outside the loop of the intermediate transfer belt 22 to hold the intermediate transfer belt 22 with the tension roller 20 disposed inside the loop of the intermediate transfer belt 22. By so doing, a secondary transfer nip region is formed between a front face of the intermediate transfer belt 22 and the secondary transfer roller 21.

A secondary transfer bias is applied by the transfer bias power supply to the secondary transfer roller 21. This application of the secondary transfer bias forms a secondary transfer electric field between the secondary transfer roller 21 and the tension roller 20 that is electrically grounded.

A sheet tray 41 is disposed vertically below the transfer unit 75. The sheet tray 41 accommodates multiple recording media in a bundle of sheets. The sheet tray 41 is slidably and detachably attached to the apparatus body 200 of the image forming apparatus 100. The sheet tray 41 includes a feed roller 42 that is disposed in contact with a recording medium that is placed on top of the bundle of sheets. As the feed roller 42 rotates in the counterclockwise direction in FIG. 1 at a predetermined timing, the recording medium is fed toward a sheet conveying passage.

A pair of registration rollers 43 is disposed at a far end of the sheet conveying passage. The pair of registration rollers 43 includes two registration rollers. The pair of registration rollers 43 stops rotating on receiving the recording medium fed from the sheet tray 41 between the two registration rollers. In synchronization of arrival of the four-color toner image formed on the intermediate transfer belt 22 in the secondary transfer nip region, the pair of registration rollers 43 starts rotating again to further convey the recording medium toward the secondary transfer nip region.

When the four-color toner image formed on the intermediate transfer belt 22 closely contacts the recording medium at the secondary transfer nip region, the four-color toner image is transferred onto the recording medium due to the secondary transfer electric field and the nip pressure. At this time, the four-color toner image is combined with white color of the recording medium to make a full-color toner image. By so doing, the full-color toner image is formed on a front face of the recording medium. As the recording medium with the full-color toner image on the front face passes the secondary transfer nip region, the recording medium separates from the secondary transfer roller 21 and the intermediate transfer belt 22 due to curvature separation.

Then, the recording medium travels through a post-transfer conveying passage and reaches a fixing device 40.

The fixing device 40 includes a fixing roller 45 and a pressure roller 47. The fixing roller 45 includes a heat generating source 45a such as a halogen lamp. The pressure roller 47 rotates while pressing against the fixing roller 45 with a predetermined pressing force. The fixing roller 45 and the pressure roller 47 contact each other to form a fixing nip region. The recording medium conveyed to the fixing device 40 is held in the fixing nip region such that a face on which an unfixed toner image is formed contacts the fixing roller 45. Then, toner in the unfixed toner image melts by application of heat and pressure, so that the full-color toner image is fixed to the recording medium.

Then, the recording medium that is discharged from the fixing device 40 is conveyed to a pair of sheet output rollers 90.

In a case in which a single side printing mode is selected, the recording medium held in a sheet discharging nip region formed by the pair of sheet output rollers 90 is discharged due to a forward rotation of the pair of sheet output rollers 90 to the outside of the image forming apparatus 100. Then, the recording medium is conveyed and stacked in a sheet stacking portion 56 that is provided on a top face of an upper cover of the apparatus body 200 of the image forming apparatus 100.

By contrast, in a case in which a duplex printing mode is selected, the recording medium held in the sheet discharging nip region formed by the pair of sheet output rollers 90 is conveyed to the outside of the image forming apparatus 100 for a predetermined length. Then, the pair of sheet output rollers 90 rotates in a reverse direction that is opposite to the forward direction, so that the recording medium is returned to the inside of the image forming apparatus 100. At this time, the front and back faces of the recording medium are reversed. That is, the trailing end of the recording medium is turned to the leading end of the recording medium to be conveyed to a downstream side of a sheet conveying direction. The leading end of the recording medium enters a sheet reversing passage 91, without returning to the post-fixing sheet conveying passage that connects the fixing device 40 and the pair of sheet output rollers 90.

The recording medium entered in the sheet reversing passage 91 as described above is reversed upside down while passing through a duplex sheet conveyance nip region formed by a pair of duplex conveying rollers 92. Then, the reversed recording medium enters the sheet conveying passage again, so as to be conveyed to the pair of registration rollers 43 again. Thereafter, the recording medium passes through the secondary transfer nip region again at the predetermined timing. At this time, a toner image is formed on the other side or the back face of the recording medium secondarily. Then, after having passed through the fixing device 40 and the pair of sheet output rollers 90, and the recording medium is conveyed to the sheet stacking portion 56 disposed the outside of the image forming apparatus 100.

After passing through the secondary transfer nip region, residual toner that has not been transferred onto the recording medium remains on the intermediate transfer belt 22. The residual toner remaining on the surface of the intermediate transfer belt 22 is removed by the belt cleaning device 71 that is disposed in contact with the surface of the intermediate transfer belt 22. The cleaning backup roller 72 that is disposed inside the loop of the intermediate transfer belt 22 supports a belt cleaning operation performed by the belt cleaning device 71 from inside the loop of the intermediate transfer belt 22.

A bypass tray 93 is disposed on a side cover of the apparatus body 200 of the image forming apparatus 100. The bypass tray 93 is openable and closable to the side cover. In a state in which the bypass tray 93 is open from the side cover, the recording medium can be loaded on the bypass tray 93. The recording medium loaded on the bypass tray 93 is fed due to rotation of a bypass feed roller 94 and conveyed to the pair of registration rollers 43 in the sheet conveying passage.

In FIG. 1, a drive transmission device 101 is disposed on a far side of the sheet tray 41 in the drawing. The drive transmission device 101 transmits a driving force to the sheet feed roller 42. This drive transmission device 101 not only transmits the driving force to the sheet feed roller 42 but also to the pair of registration rollers 43, the pair of duplex conveying rollers 92, and the bypass feed roller 94. The drive transmission device 101 is detachably attached to the apparatus body 200 of the image forming apparatus 100.

Figure 3:
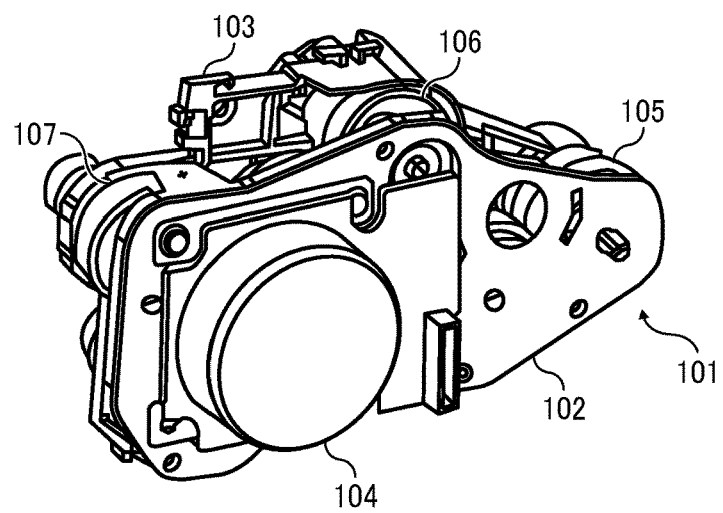
FIG. 3 is a perspective view illustrating a drive transmission device included in the image forming apparatus of FIG. 1.

FIG. 3 is a perspective view illustrating the drive transmission device 101 included in the image forming apparatus 100 of FIG. 1.

As illustrated in FIG. 3, the drive transmission device 101 includes a metal bracket 102 and a resin cover 103. The metal bracket 102 and the resin cover 103 function opposing members disposed facing each other and form a gap therebetween. The metal bracket 102 and the resin cover 103 rotatably hold multiple clutch gears in the gap. The metal bracket 102 includes a metallic plate. A sheet feed drive motor 104 is fixed to a front face of the metal bracket 102. The sheet feed drive motor 104 has a motor shaft that goes through a through hole on the metal bracket 102 and reaches the gap between the metal bracket 102 and the resin cover 103.

Figure 9:
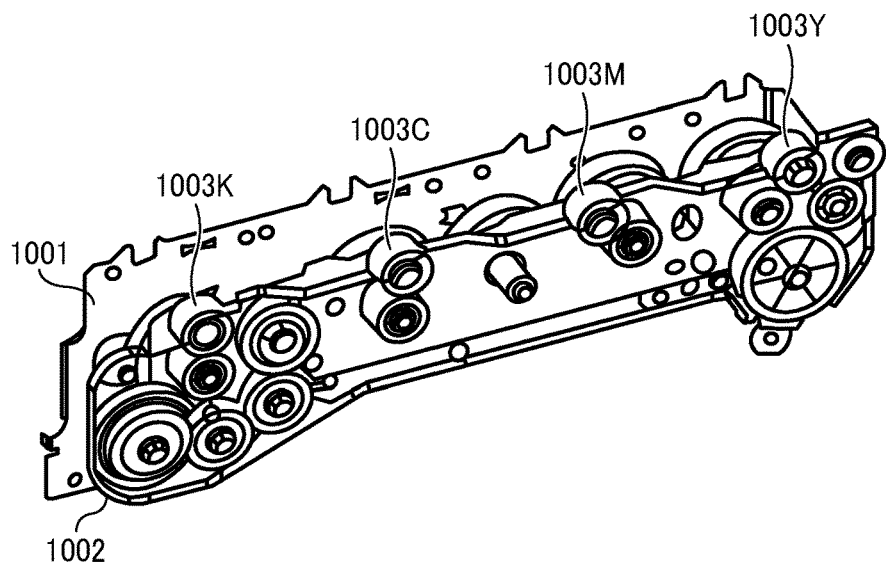
FIG. 9 is a perspective view illustrating a comparative drive transmission unit.

FIG. 9 is a perspective view illustrating a comparative drive transmission unit.

The comparative drive transmission unit includes two unit plates 1001 and 1002 and multiple gears. The two unit plates 1001 and 1002 are disposed facing each other with a gap across the two unit plates 1001 and 1002. The multiple gears are meshed with each other and are rotatably supported in the gap formed between the two unit plates 1001 and 1002. After the drive transmission unit is attached to an apparatus body of an image forming apparatus, photoconductors having respective single color toners of black (K), cyan (C), magenta (M), and yellow (Y), each functioning as a driven body, are detachably attached to the apparatus body, the following gear meshing is performed. Specifically, the respective photoconductors of black (K), cyan (C), magenta (M), and yellow (Y) have rotary shafts to which respective photoconductor gears are fixed. When the photoconductors are set to the apparatus body of the image forming apparatus, respective gear tips of the photoconductor gears are firstly set into the gap between the unit plates 1001 and 1002 of the comparative drive transmission unit. Accordingly, the photoconductors are meshed with corresponding gears 1003K, 1003C, 1003M, and 1003Y disposed in the gap. Due to this meshing of the photoconductor gears and the corresponding gears in the gap, the driving force is transmitted from the drive transmission unit to the photoconductors.

Figure 10:
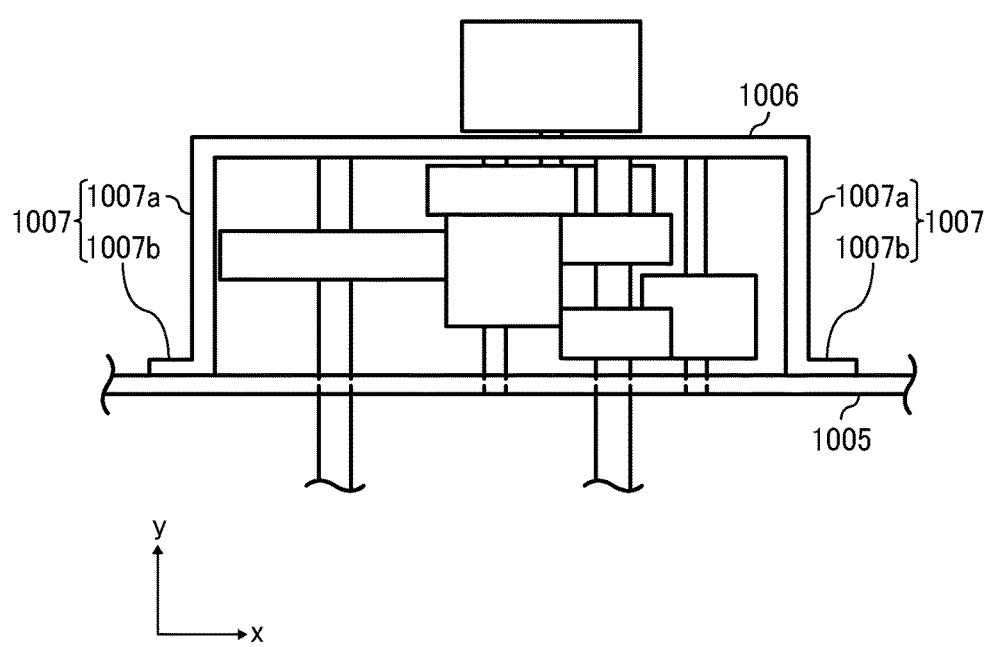
FIG. 10 is a side view illustrating a comparative drive transmission mechanism different from the comparative drive transmission unit of FIG. 9.

FIG. 10 is a side view illustrating a comparative drive transmission mechanism.

As illustrated in FIG. 10, the drive transmission mechanism includes an apparatus body plate 1005, a bracket 1006, and multiple gears. The apparatus body plate 1005 and the bracket 1006 form a gap therebetween. The multiple gears are rotatably contained in the gap. The bracket 1006 has multiple legs 1007 formed as a single unit. Each of the multiple legs 1007 includes a leg body 1007a and a bent portion 1007b. The leg body 1007a extends toward the apparatus body plate 1005. The bent portion 1007b is bent at a lower end portion of the leg body 1007a at an angle of about 90 degrees and the bent part contacts a surface of the apparatus body plate 1005. A bolt is inserted into a through hole formed in the bent portion 1007b. By fastening the bolt to an internal thread of the apparatus body plate 1005, the bracket 1006 is fixedly secured to the apparatus body plate 1005.

Drive transmission devices that are detachably attached to an apparatus body of an image forming apparatus, e.g., the comparative drive transmission unit illustrated in FIG. 9 and the drive transmission device 101 according to an embodiment of this disclosure, are expected to reduce the size and weight for achievement of easier detaching and attaching operations.

However, if the legs 1007 used in the comparative drive transmission mechanism illustrated in FIG. 10 are employed in order to fix the two unit plates 1001 and 1002 each other in the comparative drive transmission unit illustrated in FIG. 9, it is not likely to achieve a reduction in size of the comparative drive transmission unit of FIG. 9. That is, when respective bent portions 1007b of the multiple legs 1007 are formed on one of the unit plates 1001 and 1002 as a single unit, multiple contact areas to which the respective bent portions 1007b of the multiple legs 1007 closely contact are secured on the other of the unit plates 1001 and 1002. As a result, this configuration is difficult to reduce a plane area of the unit plates 1001 and 1002.

Specifically, in a device that transmits a driving force to a sheet feed member or sheet feed members such as the drive transmission device 101 included in the image forming apparatus 100 according to an embodiment of this disclosure, each distance between the sheet feed members is significantly small due to space saving. Therefore, it is difficult to secure a contact area to which the leading edge of a leg member contact on the surface of a unit plate (i.e., the metal bracket 102 of the drive transmission device 101 according to an embodiment of this disclosure).

The comparative drive transmission unit illustrated in FIG. 9 has the configuration in which the photoconductor gear provided outside the comparative drive transmission unit is inserted in the gap formed between the two unit plates 1001 and 1002 so as to mesh the photoconductor gear with the gear in the comparative drive transmission unit. However, the configuration of the comparative drive transmission unit in FIG. 9 is not suitable to the following layout of parts and units. That is, the layout includes a drive transmission target member disposed facing an outer face of one of the unit plates 1001 and 1002 that drive a rotation driving force applied to the drive transmission target member. In this case, it is expected that the configuration includes a complex drive transmission system having the above-described photoconductor gear or a gear to be inserted into the gap formed between the unit plates to mesh with the gear disposed in the gap and multiple drive transmission members to transmit the rotation driving force exerted by the gear to the drive transmission target member disposed at a position facing the outer face of one of the unit plates.

In addition, the configuration such as the comparative drive transmission unit illustrated in FIG. 9 has the gear provided between the two unit plates 1001 and 1002 and rotatably held by one of the two unit plates 1001 and 1002. However, this configuration generates a noise that increases as the distance between the two unit plates 1001 and 1002 becomes greater. To be more specific, as the distance between the two unit plates 1001 and 1002 increases, a runout of the gear and a runout of a rotary shaft member that rotates together with the gear increase. As a result, the runouts make a noise that is generated at a meshing portion of the gears greater.

Now, a description is given of the image forming apparatus 100 according to an example of this disclosure.

Figure 4:
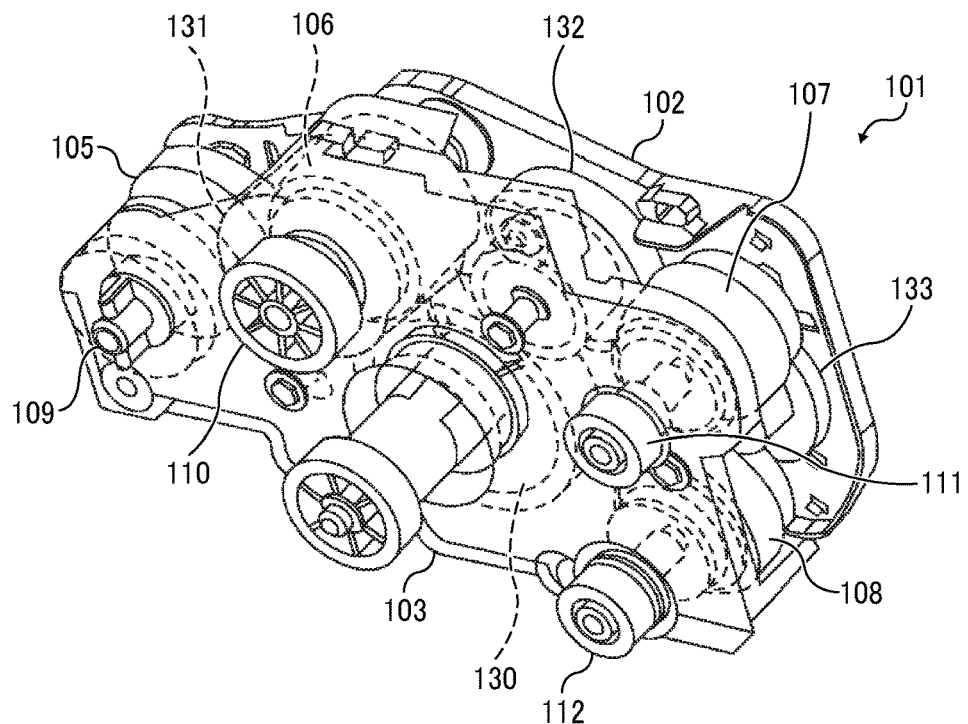
FIG. 4 is a perspective view illustrating the drive transmission device, viewed from an angle in a direction opposite to the direction in FIG. 3.
Figure 5:
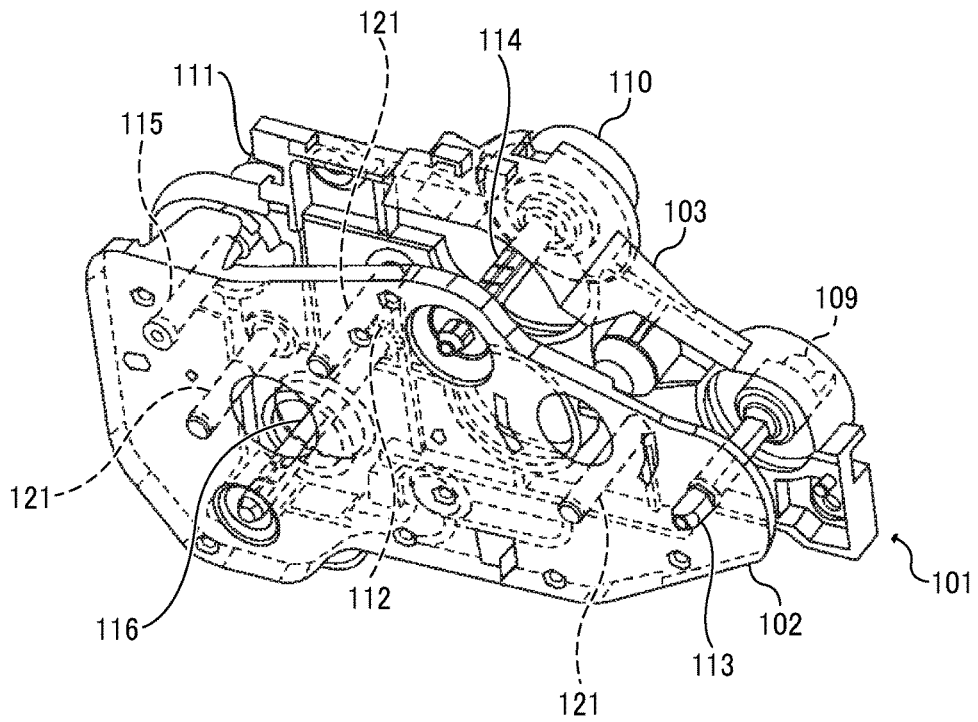
FIG. 5 is a perspective view illustrating the drive transmission device in a state in which various clutch gears, various relay gears, and a sheet feed drive motor are removed from the drive transmission device.
Figure 11:
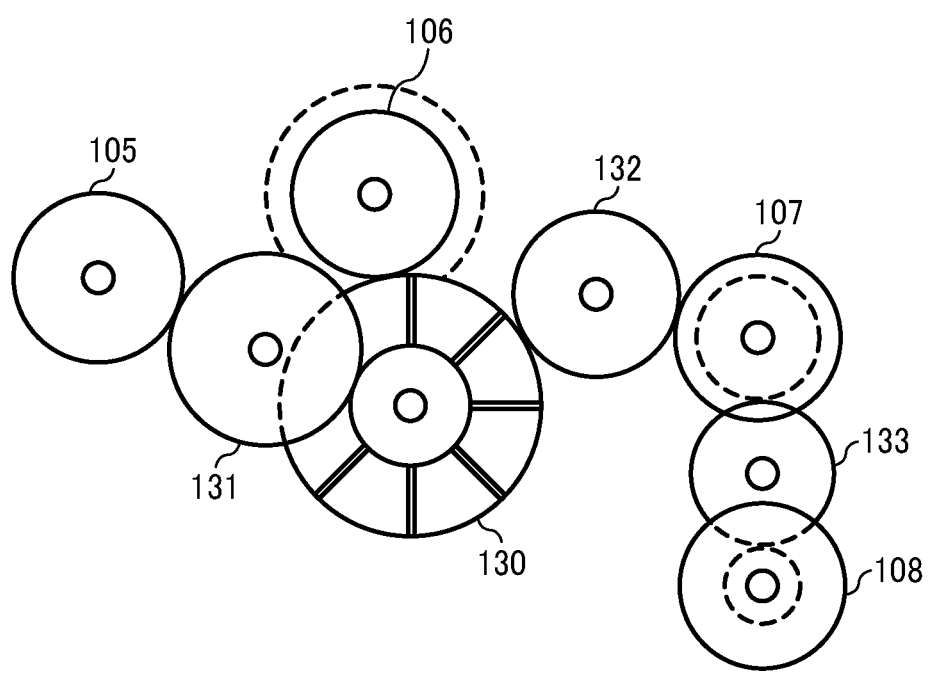
FIG. 11 is a diagram illustrating meshing of various gears of the drive transmission device.

FIG. 4 is a perspective view illustrating the drive transmission device 101, viewed from an angle in a direction opposite to the direction in FIG. 3. FIG. 5 is a perspective view illustrating the drive transmission device 101 in a state in which various clutch gears, various relay gears, and a sheet feed drive motor 104 are removed from the drive transmission device 101. FIG. 11 is a diagram illustrating meshing of various gears of the drive transmission device 101.

In FIGS. 4, 5, and 11, the metal bracket 102 and the resin cover 103 function opposing members disposed facing each other. The metal bracket 102 and the resin cover 103 are coupled to each other without contacting and via three studs 121 that function as fixed shafts unrotatably held between the metal bracket 102 and the resin cover 103. Each one end of the studs 121 is inserted and fitted to a through hole formed in the metal bracket 102 so as to be fixed to the metal bracket 102. The other end of the studs 121 is provided with an internal thread portion that extends in an axial direction. The bolt inserted into the through hole formed in the resin cover 103 is secured to the internal thread portion provided to the other end of the studs 121. Accordingly, the other end of the studs 121 are fixed to the resin cover 103.

As described above, the studs 121 having no bent or protruding portions connect the metal bracket 102 with the resin cover 103. By so doing, when compared with a case in which the metal bracket 102 and the resin cover 103 are connected via the legs having the bent portions, the drive transmission device 101 can be reduced in size.

Since the studs 121 exist between the metal bracket 102 and the resin cover 103, a gap is formed therebetween. A sheet feed clutch gear 105, a registration clutch gear 106, a duplex clutch gear 107, and a bypass clutch gear 108 are rotatably disposed in the gap. Further, a fourth relay gear 133, a second relay gear 131, a third relay gear 132, and a fourth relay gear 133 are rotatably disposed in the gap.

In FIG. 5, the metal bracket 102 and the resin cover 103 rotatably hold a sheet feed shaft coupling, a registration shaft gear, a duplex shaft gear, and a bypass shaft gear.

The sheet feed shaft coupling includes a rotary shaft 113 and a sheet feed coupling 109 fixedly attached to one end of the rotary shaft 113. Both the rotary shaft 113 and the sheet feed coupling 109 are made of resin material and rotate integrally.

Further, the registration shaft gear includes a rotary shaft 114 and a registration gear 110 fixedly attached to one end of the rotary shaft 114. Both the rotary shaft 114 and the registration gear 110 are made of resin material and rotate integrally.

Further, the duplex shaft gear includes a rotary shaft 115 and a duplex gear 111 fixedly attached to one end of the rotary shaft 115. Both the rotary shaft 115 and the duplex gear 111 are made of resin material and rotate integrally.

Further, the bypass shaft gear includes a rotary shaft 116 and a bypass gear 112 fixedly attached to one end of the rotary shaft 116. Both the rotary shaft 116 and the bypass gear 112 are made of resin material and rotate integrally.

As illustrated in FIG. 5, a sheet feed shaft coupling, a registration shaft gear, a duplex shaft gear, and a bypass shaft gear are rotatably held by the metal bracket 102 and the resin cover 103 while penetrating both of the metal bracket 102 and the resin cover 103. Specifically, the sheet feed shaft coupling includes the sheet feed coupling 109 that is attached to one end in a rotational axial direction of the sheet feed shaft coupling and is located outside the resin cover 103. In this state, a slide bearing that is mounted on the resin cover 103 rotatably receives one end in a rotational axial direction of the rotary shaft 113. Further, another slide bearing that is mounted on the metal bracket 102 rotatably receives the other end in the rotational axial direction of the rotary shaft 113.

In addition, the registration shaft gear, the duplex shaft gear, and the bypass shaft gear include the registration gear 110, the duplex gear 111, and the bypass gear 112, respectively, disposed at respective one ends in the rotational axial directions of the registration shaft gear, the duplex shaft gear, and the bypass shaft gear, respectively, and are located outside the resin cover 103. In this state, respective slide bearings that are mounted on the resin cover 103 rotatably receive one ends in the rotational axial direction of the rotary shafts 114, 115, and 116, respectively. Further, different slide bearings that are mounted on the metal bracket 102 rotatably receive the other ends in the rotational axial direction of the rotary shafts 114, 115, and 116.

Figure 6:
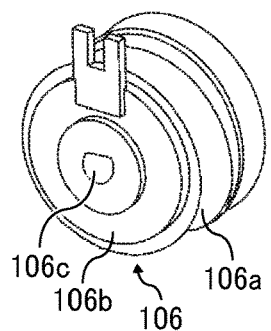
FIG. 6 is a perspective view illustrating a registration clutch gear of the drive transmission device.
Figure 7:
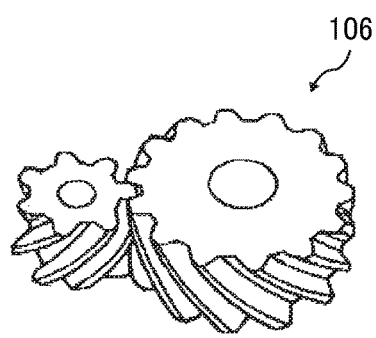
FIG. 7 is a perspective view illustrating an example of a helical gear.

FIG. 6 is a perspective view illustrating the registration clutch gear 106 included in the drive transmission device 101. FIG. 7 is a perspective view illustrating an example of a helical gear.

The registration clutch gear 106 includes a gear portion 106a, an electromagnetic clutch 106b, and a through hole 106c. The gear portion 106a is mounted on an outer circumference edge of the registration clutch gear 106. The electromagnetic clutch 106b is disposed inside the gear portion 106a. The through hole 106c is inserted through a rotation center position. The gear portion 106a has a shape of a helical gear.

It is to be noted that the helical gear illustrated in FIG. 7 is depicted as the registration clutch gear 106, for example. However, a gear portion having the shape of a helical gear is not limited to the gear portion 106a. For example, any gear having a gear portion of a helical gear, e.g., the sheet feed clutch gear 105, the duplex clutch gear 107, and the bypass clutch gear 108 can be applied to this disclosure.

As illustrated in FIG. 7, the helical gear has teeth cut at an angle to the rotational axial direction. In the drive transmission device 101, various clutch gears and relay gears are helical gears.

In FIG. 6, the electromagnetic clutch 106b is turned on to rotate with the gear portion 106a. By contrast, when the electromagnetic clutch 106b is turned off, even when the electromagnetic clutch 106b rotates, a rotation force applied by the electromagnetic clutch 106b is not transmitted to the gear portion 106a. Therefore, the electromagnetic clutch 106b keeps idling inside the gear portion 106a. The through hole 106c is not perfect circle in cross section but has a D shape.

Figure 8:
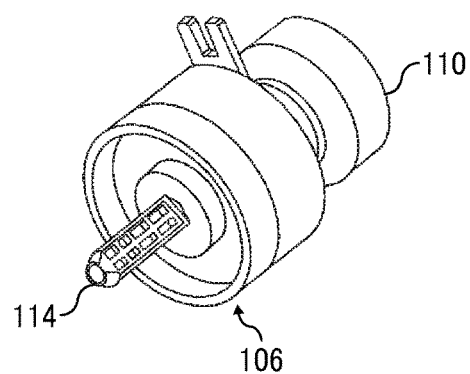
FIG. 8 is a perspective view illustrating a registration shaft gear of the drive transmission device and a registration clutch gear meshed with the registration shaft gear.

FIG. 8 is a perspective view illustrating the registration shaft gear of the drive transmission device 101 and the registration clutch gear 106 meshed with the registration shaft gear.

The rotary shaft 114 of the registration shaft gear is not perfect circle in cross section but has a D shape. The registration shaft gear penetrates the through hole (i.e., the through hole 106c in FIG. 6) of the registration clutch gear 106. By so doing, the registration shaft gear is engaged with the registration clutch gear 106. As the registration shaft gear rotates, the electromagnetic clutch 106b of the registration clutch gear 106 that is engaged with the registration shaft gear is rotated together with the registration shaft gear. At this time, in a case in which the electromagnetic clutch 106b is turned on, the gear portion 106a of the registration clutch gear 106 is also rotated together with the registration shaft gear.

By contrast, in a case in which the electromagnetic clutch 106b is not turned on, the gear portion 106a is not rotated while the electromagnetic clutch 106b keeps idling inside the gear portion 106a. By contrast, in a case in which the electromagnetic clutch 106b is not turned on, the gear portion 106a is not rotated while the electromagnetic clutch 106b keeps idling inside the gear portion 106a. Further, even if the gear portion 106a rotates after receiving a rotation force from outside, the electromagnetic clutch 106b does not rotate and the gear portion 106a keeps idling on the electromagnetic clutch 106b.

Similar to the combination of the registration shaft gear and the registration clutch gear 106, a shaft gear and a clutch gear are meshed with each other in a combination of the duplex shaft gear and the duplex clutch gear 107 and a combination of the bypass shaft gear and the bypass clutch gear 108. Further, the sheet feed shaft coupling and the sheet feed clutch gear 105 are also meshed with each other in the combination thereof.

In FIG. 4, a motor gear (e.g., a helical gear) mounted on a motor shaft of a sheet feed drive motor (i.e., the sheet feed drive motor 104 in FIG. 3) is meshed with a small-diameter gear (e.g., a helical gear) of the first relay gear 130. Accordingly, the rotation driving force of the sheet feed drive motor is transmitted to the first relay gear 130.

The small-diameter gear of the first relay gear 130 is also meshed with the second relay gear 131 (e.g., a helical gear). Further, a large-diameter gear (e.g., a helical gear) of the first relay gear 130 is meshed with the gear portion 106a of the registration clutch gear 106 and the third relay gear 132 (e.g., a helical gear). According to this configuration, the rotation driving force of the first relay gear 130 is transmitted to the second relay gear 131, the gear portion 106a of the registration clutch gear 106, and the third relay gear 132. At this time, in a case in which the electromagnetic clutch 106b of the registration clutch gear 106 is turned on, the registration shaft gear (i.e., the registration gear 110 and the rotary shaft 114) is rotated with the registration clutch gear 106 integrally.

The second relay gear 131 is meshed with a gear portion (e.g., a helical gear) of the sheet feed clutch gear 105. According to this configuration, the rotation driving force of the second relay gear 131 is transmitted to the gear portion of the sheet feed clutch gear 105. At this time, in a case in which an electromagnetic clutch of the sheet feed clutch gear 105 is turned on, the sheet feed shaft coupling (i.e., the sheet feed coupling 109 and the rotary shaft 113) is rotated with the sheet feed clutch gear 105 integrally.

The third relay gear 132 is meshed with a gear portion (e.g., a helical gear) of the duplex clutch gear 107. According to this configuration, the rotation driving force of the third relay gear 132 is transmitted to the gear portion of the duplex clutch gear 107. At this time, in a case in which an electromagnetic clutch of the duplex clutch gear 107 is turned on, the duplex shaft gear (i.e., the duplex gear 111 and the rotary shaft 115) is rotated with the duplex clutch gear 107 integrally.

The gear portion of the duplex clutch gear 107 is meshed with the fourth relay gear 133 (e.g., a helical gear). According to this configuration, the rotation driving force of the gear portion of the duplex clutch gear 107 is transmitted to the fourth relay gear 133.

Further, the fourth relay gear 133 is meshed with a gear portion (e.g., a helical gear) of the bypass clutch gear 108. According to this configuration, the rotation driving force of the fourth relay gear 133 is transmitted to the gear portion of the bypass clutch gear 108. At this time, in a case in which an electromagnetic clutch of the bypass clutch gear 108 is turned on, the bypass shaft gear (i.e., the bypass clutch gear 108 gear 112 and the rotary shaft 116) is rotated with the bypass clutch gear 108 integrally.

As the drive transmission device 101 is set to the apparatus body 200 of the image forming apparatus 100, the sheet feed coupling 109 of the sheet feed shaft coupling is engaged with a coupling provided at an axial end portion of the sheet feed roller 42. According to this configuration, the sheet feed roller 42 and the sheet feed coupling 109 are coupled to each other in the rotational axial direction to rotate with each other integrally.

Further, as the drive transmission device 101 is set to the apparatus body 200 of the image forming apparatus 100, the registration gear 110 of the registration shaft gear is meshed with a gear that is fixed to a shaft of one of the pair of registration rollers. Accordingly, the driving force of the registration gear 110 is transmitted to the registration roller.

Further, as the drive transmission device 101 is set to the apparatus body 200 of the image forming apparatus 100, the duplex gear 111 of the duplex shaft gear is meshed with a gear portion of a duplex pulley gear attached to the apparatus body 200. According to this configuration, the rotation driving force of the duplex gear 111 is transmitted to the duplex pulley gear.

It is to be noted that the rotation driving force of the duplex pulley gear is transmitted to the pair of duplex conveying rollers 92 via a timing belt.

Further, as the drive transmission device 101 is set to the apparatus body 200 of the image forming apparatus 100, the bypass gear 112 of the bypass shaft gear is meshed with the gear portion of the duplex pulley gear attached to the apparatus body 200. According to this configuration, the rotation driving force of the bypass gear 112 is transmitted to the bypass pulley gear.

It is to be noted that the rotation driving force of the bypass pulley gear is transmitted to the bypass feed roller 94 via a timing belt.

As described above, in the drive transmission device 101, respective one ends in the rotational axial direction of the rotary shafts 113, 114, 115, and 116 are rotatably held while penetrating the rotary shafts 113, 114, 115, and 116 through the resin cover 103 that is one of the opposing members. In addition to the operation in which the rotary shafts 113, 114, 115, and 116 are rotated inside the resin cover 103 (on the side facing the metal bracket 102), the rotary shafts 113, 114, 115, and 116 can also rotate outside the resin cover 103 due to the penetration through the resin cover 103. Then, the sheet feed coupling 109, the registration gear 110, the duplex gear 111, and the bypass gear 112 that function as drive transmission portions are provided at respective positions at which the rotary shafts 113, 114, 115, and 116 are rotated outside the resin cover 103.

According to this configuration, the rotation driving forces of the rotary shafts 113, 114, 115, and 116 are directly transmitted to rotary bodies (i.e., the sheet feed coupling 109, the registration gear 110, the duplex gear 111, and the bypass gear 112) on the side of the apparatus body facing the outer face of the resin cover 103 without meshing with multiple drive transmission members outside the drive transmission device 101. Accordingly, the rotation driving force can be transmitted to the rotary body disposed facing the outer face of the resin cover 103, without providing the multiple drive transmission members outside the drive transmission device 101.

Further, in the drive transmission device 101, in addition to the state in which the respective one end sides in the rotational axial direction of the rotary shafts 113, 114, 115, and 116 are rotatably held by the resin cover 103, the other end sides in the rotational axial direction of the rotary shafts 113, 114, 115, and 116 are also rotatably held by the metal bracket 102. Due to the support of the metal bracket 102 and the resin cover 103, even if the distance between the metal bracket 102 and the resin cover 103 increases, the rotary shafts 113, 114, 115, and 116 can be held at respective constant positions without causing runouts at both ends of the rotary shafts 113, 114, 115, and 116. Accordingly, this configuration can prevent occurrence of noise caused by runouts of various clutch gears rotating between the resin cover 103 and the metal bracket 102 and runouts of the rotary shafts 113, 114, 115, and 116 rotating together with the clutch gears.

In the image forming apparatus 100 according to the present embodiment of this disclosure, as described above, multiple helical gears are provided as various gears rotatably disposed between the metal bracket 102 and the resin cover 103. These helical gears are used to reduce or restrain a noise generated due to meshing of gears at a gear meshing portion, compared with spur gears.

The metallic studs 121 are firmly fitted into the through hole of the metal bracket 102 made of metal. Therefore, even if a torsion force is added to the studs 121, it is not likely that the studs 121 are inclined to the metal bracket 102. By contrast, when compared with the metallic studs 121, the resin cover 103 made of resin material has lower rigidity. Therefore, when a torsion force is added to the studs 121, an end of each stud 121 bites into the resin cover 103 having a lower rigidity, which is likely to result in an inclination of the studs 121 toward the resin cover 103. When such an inclination occurs, a position relation of the metal bracket 102 and the resin cover 103 is moved or displaced from a regular positional relation. At this time, am excessive force is applied to the various drive transmission members, resulting in an increase in torque. Specifically, since a configuration such as the image forming apparatus 100 in which helical gears are employed as gears for a reduction in noise, a torsion force that is caused by recoil or opposite reaction of the meshing of gears and is applied to the studs 121 is generated more easily when compared with a configuration employing spur gears.

In order to address this inconvenience, in the image forming apparatus 100 according to the present embodiment of this disclosure, the rotary shafts 113, 114, 115, and 116 are caused to pass through the respective through holes formed in the metal bracket 102. By so doing, the rotary shafts 113, 114, 115, and 116 are positioned to the metal bracket 102. In addition, the rotary shafts 113, 114, 115, and 116 are also caused to pass through the respective through holes formed in the resin cover 103. By so doing, the rotary shafts 113, 114, 115, and 116 are positioned to the resin cover 103. With the positioning of the rotary shafts 113, 114, 115, and 116 to both the metal bracket 102 and the resin cover 103, the metal bracket 102 and the resin cover 103 are reliably located at respective predetermined relative positions. Consequently, the metal bracket 102 and the resin cover 103 can be prevented from misalignment of the respective relative positions due to application of torsion force to the studs 121.

The rotary shafts 113, 114, 115, and 116 provided in the image forming apparatus 100 are made of resin materials. In this configuration, when compared with a configuration employing rotary shafts employing metallic materials, a reduction in sliding sound that occurs when the rotary shafts 113, 114, 115, and 116 slide on an inner wall of the through hole of the resin cover 103 and an inner wall of the through hole of the metal bracket 102 can be achieved.

This configurations according to the above-descried embodiments are not limited thereto. This disclosure can achieve the following aspects effectively.

Aspect A.

In Aspect A, a drive transmission device (for example, the drive transmission device 101) is detachably attached to an apparatus body (for example, the apparatus body 200) configured to include a driven body (for example, the sheet feed roller 42, the pair of pair of registration rollers 43, the pair of duplex conveying rollers 92, and the bypass feed roller 94) to which a driving force is transmitted. The drive transmission device includes a first opposing body (for example, the metal bracket 102), a second opposing body (for example, the resin cover 103), a gear (for example, the gear portion of the sheet feed clutch gear 105, the gear portion 106a of the registration clutch gear 106, the gear portion of the duplex clutch gear 107, and the gear portion of the bypass clutch gear 108), and a rotary shaft (for example, the rotary shafts 113, 114, 115, and 116). The first opposing body and the second opposing body are two opposing bodies disposed facing each other and form a gap therebetween. The gear is rotatably disposed in the gap formed between the first opposing body and the second opposing body. The rotary shaft is configured to receive the driving force from a drive source (for example, the sheet feed drive motor 104) and rotate in the gap. One rotational axial end of the rotary shaft is passed through the second opposing body and rotatably supported by the gap.

In the Aspect A, one end side in the rotational axial direction of the rotary shaft that is rotated between the two opposing bodies is penetrated through the second opposing body, and therefore the one end side of the rotary shaft is rotated at an opposing position to an outer circumferential surface of the second opposing body. As described above, a rotation driving force can be transmitted directly from the rotary shaft that is rotated at the opposing position to the outer circumferential surface of an opposing body to an apparatus body side drive transmission target member that is disposed facing the outer circumferential surface of the opposing body. Accordingly, the rotation driving force can be transmitted to the drive transmission target member disposed facing the outer circumferential surface of the opposing body in the drive transmission device, without providing complex drive transmission members to the apparatus body.

Aspect B.

In Aspect A, the drive transmission device further includes multiple fixing shafts (for example, the studs 121) unrotatably disposed between the first opposing body (for example, the metal bracket 102) and the second opposing body (for example, the resin cover 103). The multiple fixing shafts are configured to couple the first opposing body and the second opposing body. The other rotational axial end of the rotary shaft (for example, the rotary shafts 113, 114, 115, and 116) is rotatably held by the first opposing body.

In Aspect B, the multiple fixing shafts disposed between the two opposing bodies are configured to couple the two opposing bodies. By so doing, different from the configuration in which the two opposing bodies are coupled by legs having respective bent portions, a space (for example, a contact area) on a surface of the opposing body is not secured to contact the bent portions of the legs. Accordingly, when compared with the configuration in which the two opposing bodies are coupled by the legs, the drive transmission device according to the present embodiment of this disclosure can achieve a reduction in size.

Further in Aspect B, in addition to that the one axial end of the rotary shaft is rotatably held by penetrating the second opposing body, the other axial end of the rotary shaft is rotatably held by the first opposing body. Due to the support of the rotary shaft by the two opposing bodies, even if the distance between the two opposing bodies increases, the rotary shaft can be held at a constant position without causing runout at both ends of the rotary shaft. Accordingly, this configuration can prevent occurrence of noise caused by runout of the gears (for example, the gear portion of the sheet feed clutch gear 105, the gear portion of registration clutch gear 106, the gear portion of the duplex clutch gear 107, and the gear portion of the bypass clutch gear 108) rotating between the two opposing bodies and runout of the rotary shaft rotating together with the gear.

Aspect C.

In Aspect B, the other rotational axial end of the rotary shaft (for example, the rotary shafts 113, 114, 115, and 116) is passed through a through hole formed in the first opposing body (for example, the metal bracket 102) and is rotatably held by the first opposing body.

According to the above-described configuration, by causing the one axial end of the rotary shaft to pass through the second opposing body, the one axial end of the rotary shaft is positioned to the second opposing body. In addition, by causing the other axial end of the rotary shaft to pass through the first opposing body, the other axial end of the rotary shaft is positioned to the first opposing body. With the positioning of the rotary shaft to both of the two opposing bodies, the two opposing bodies are reliably located at respective predetermined relative positions. Consequently, the two opposing bodies can be prevented from misalignment of the respective relative positions due to application of torsion force to the rotary shaft.

Aspect D.

In Aspect C, the second opposing body (for example, the resin cover 103) includes resin materials and the first opposing body (for example, the metal bracket 102) includes metallic materials.

According to the above-described configuration, the two opposing bodies according to the present embodiment of this disclosure can increase the strength of the entire opposing bodies when compared with a configuration in which both of the two opposing bodies include resin materials, and can reduce the weight of the entire opposing bodies when compared with a configuration in which a configuration in which both of the two opposing bodies include metallic materials.

Aspect E.

In Aspect D, the gear includes a helical gear.

According to the above-described configuration, occurrence of noise can be reduced when compared with a configuration using a spur gear.

Aspect F.

In Aspect E, the rotary shaft includes a resin material.

Accordingly, when compared with a configuration employing a rotary shaft including a metallic material, the above-described configuration can achieve a reduction in sliding sound that occurs when the rotary shaft contacts and slides with an inner wall of the through hole formed in either one of the first opposing body and the second opposing body.

Aspect G.

In Aspect E or Aspect F, at least three combinations of the rotary shaft and the helical gear mounted on the rotary shaft are included.

According to the above-described configuration, each of the two opposing bodies is positioned at at least three points by penetration of at least three rotary shafts through the through holes formed in each of the two opposing bodies.

Aspect H.

In any one of Aspect C through Aspect G, the drive source (for example, the sheet feed drive motor 104) is configured to drive the driven body (for example, the sheet feed roller 42, the pair of pair of registration rollers 43, the pair of duplex conveying rollers 92, and the bypass feed roller 94) includes a motor. The motor is fixed to the first opposing body (for example, the metal bracket 102).

According to the above-described configuration, the motor can be fixed to the opposing body made of the metallic material reliably.

Aspect I.

In Aspect I, an image forming apparatus (for example, the image forming apparatus 100) includes an apparatus body (for example, the apparatus body 200), an image forming device (for example, an recording sheet forming apparatus (for example, the image forming apparatus 100) includes an image forming device (for example, the image forming units 26K, 26C, 26M, and 26Y), and the drive transmission device (for example, the drive transmission device 101) according to any one of Aspect A through Aspect H. The image forming device is configured to form an image on a recording medium. The drive transmission device is detachably attachable to the apparatus body and configured to support the image forming device.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. A drive transmission device detachably attached to an apparatus body configured to include a driven body to which a driving force is transmitted, the drive transmission device comprising:
a first opposing body and a second opposing body disposed facing each other and forming a gap therebetween;
a gear rotatably disposed in the gap formed between the first opposing body and the second opposing body; and
a rotary shaft configured to receive the driving force from a drive source and rotate in the gap,
wherein one rotational axial end of the rotary shaft passes through the second opposing body and is rotatably supported by the second opposing body in the gap, wherein the first opposing body, the second opposing body, the gear, and the rotary shaft are integrally coupled and are detachably attached to the apparatus body as a single unit.

2. The drive transmission device according to claim 1, further comprising multiple fixing shafts unrotatably disposed between the first opposing body and the second opposing body, wherein the multiple fixing shafts are configured to couple the first opposing body and the second opposing body, and wherein the other rotational axial end of the rotary shaft is rotatably held by the first opposing body.

3. The drive transmission device according to claim 2, wherein the other rotational axial end of the rotary shaft is passed through a through hole formed in the first opposing body and is rotatably held by the first opposing body.

4. The drive transmission device according to claim 3, wherein the second opposing body includes resin materials and the first opposing body includes metallic materials.

5. The drive transmission device according to claim 4, wherein the gear includes a helical gear.

6. The drive transmission device according to claim 5, wherein the rotary shaft includes a resin material.

7. The drive transmission device according to claim 5, wherein at least three combinations of the rotary shaft and the helical gear mounted on the rotary shaft are included.

8. The drive transmission device according to claim 1, wherein the drive source configured to drive the driven body includes a motor, and wherein the motor is fixed to the first opposing body.

9. An image forming apparatus comprising:

an apparatus body;

an image forming device configured to form an image on a recording medium; and the drive transmission device according to claim 1, detachably attached to the apparatus body and configured to support the image forming device.

10. The drive transmission device according to claim 1, wherein:

the rotary shaft includes multiple rotary shafts passing through the second opposing body; and the drive transmission device further comprises multiple drive transmission bodies rotatably provided at respective ends of the multiple rotary shafts.

11. The drive transmission device according to claim 1, wherein:

the second opposing body includes a second slide bearing to rotatably support a second rotational axial end of the rotary shaft; and the second rotational axial end passes through the second slide bearing of the second opposing body to protrude out a side of the second opposing body opposing the gap.

12. The drive transmission device according to claim 1, wherein:

the second rotational axial end that protrudes from the side of the second opposing body is coupled with a rotary body that rotates outside the gap.

13. The drive transmission device according to claim 1, wherein:

the rotary body includes a sheet feed coupling.

\* \* \* \* \*